March 29, 1927.

F. G. KEYES 1,622,519

APPARATUS FOR PRODUCING REFRIGERATION

Filed Feb. 19, 1920 4 Sheets-Sheet 1

INVENTOR
Frederick G. Keyes
BY
Kerr Page Cooper & Hayward
HIS ATTORNEYS

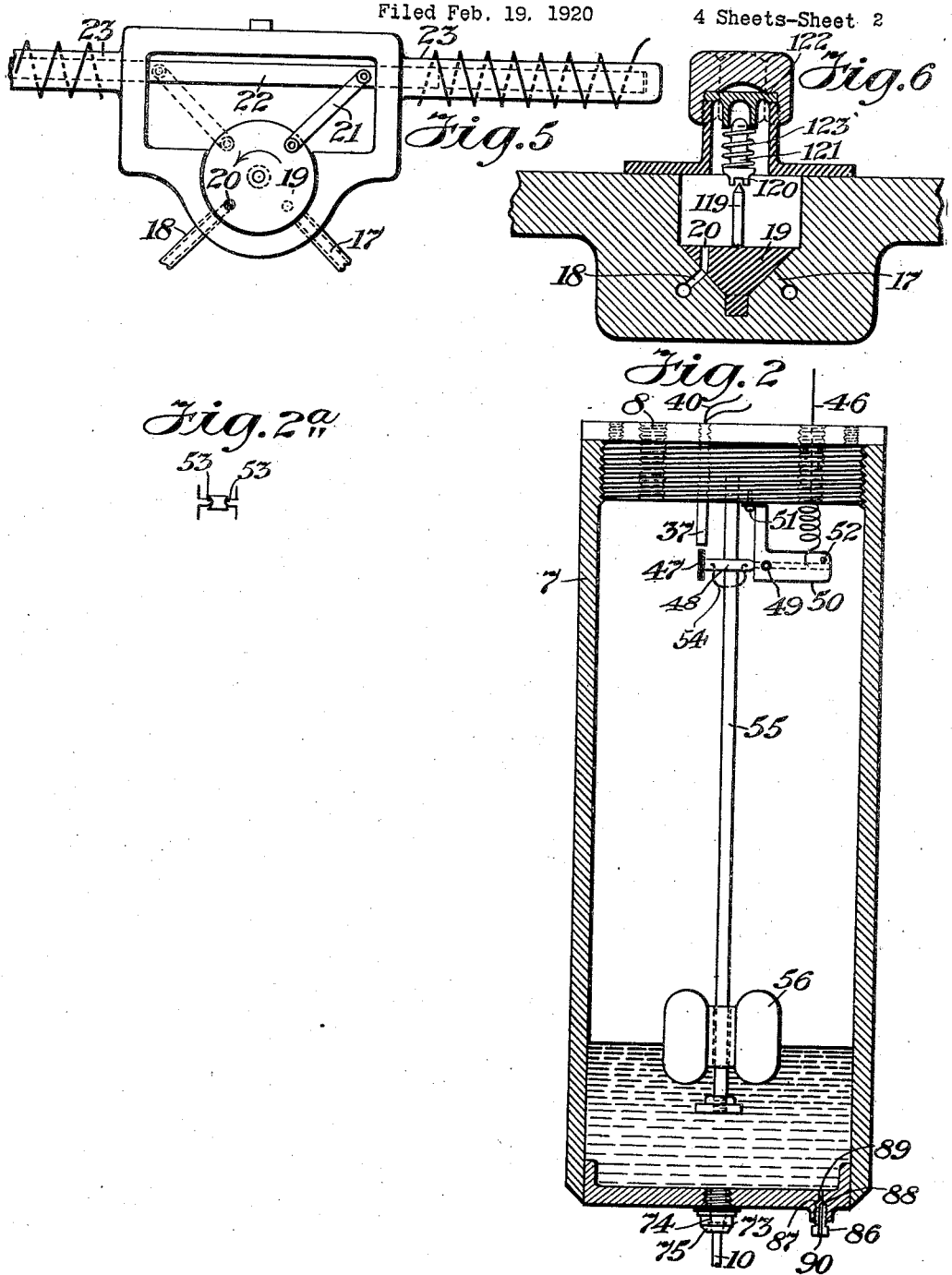

March 29, 1927.
F. G. KEYES
1,622,519
APPARATUS FOR PRODUCING REFRIGERATION
Filed Feb. 19. 1920          4 Sheets-Sheet 3
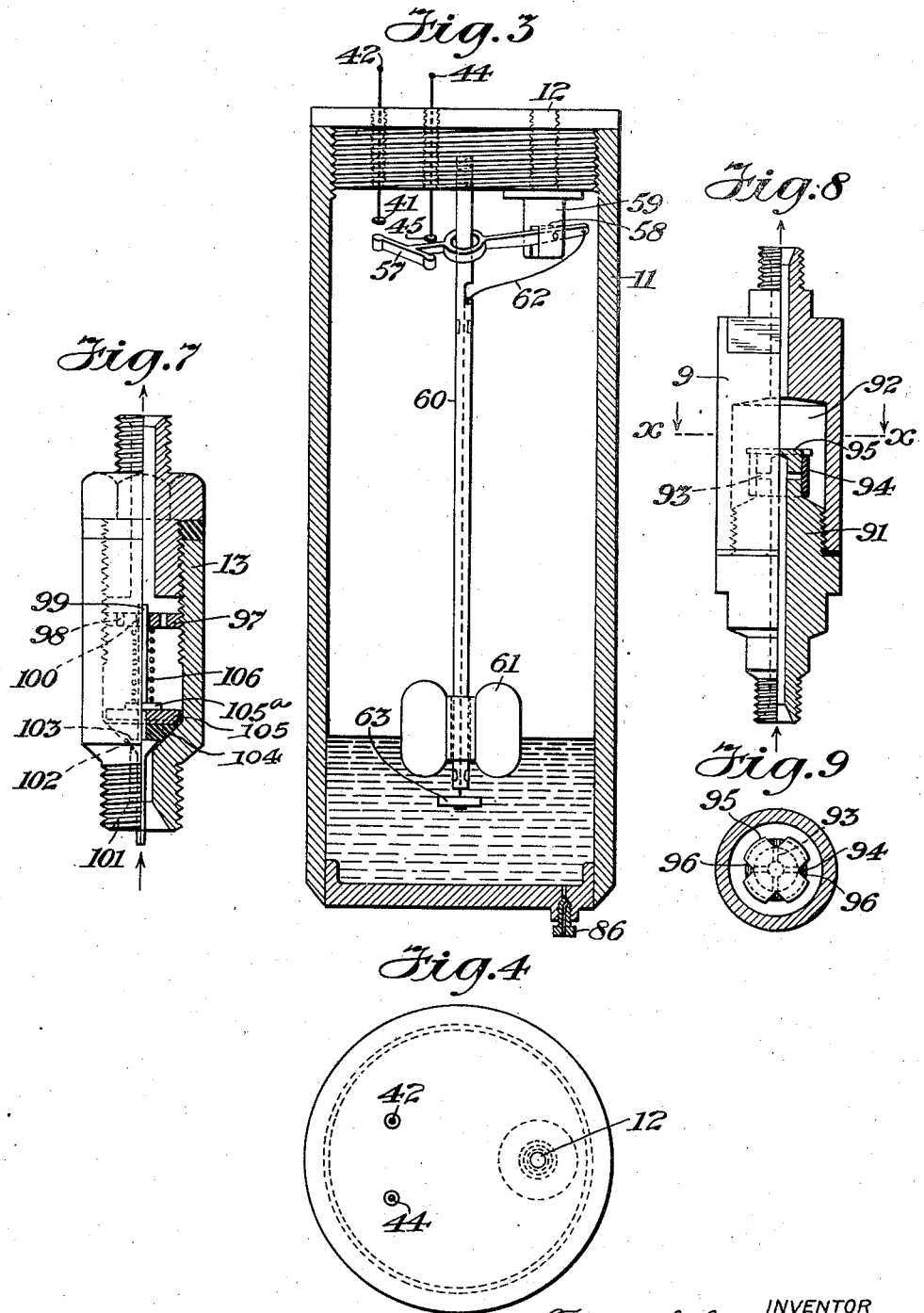

March 29, 1927.
F. G. KEYES
APPARATUS FOR PRODUCING REFRIGERATION
Filed Feb. 19, 1920 4 Sheets-Sheet 4
1,622,519
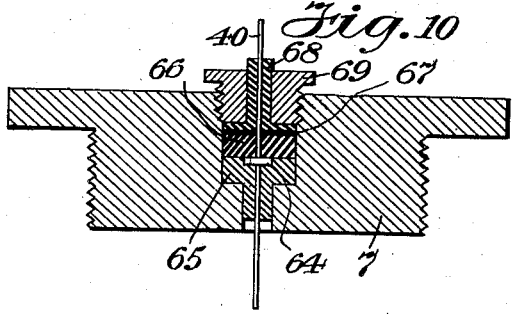
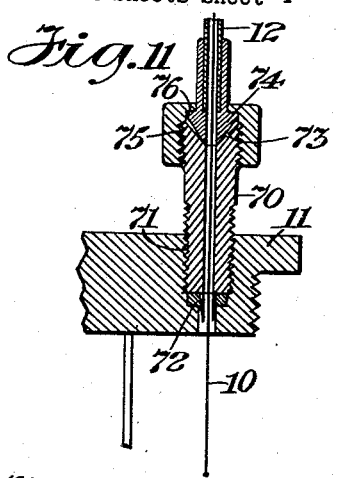
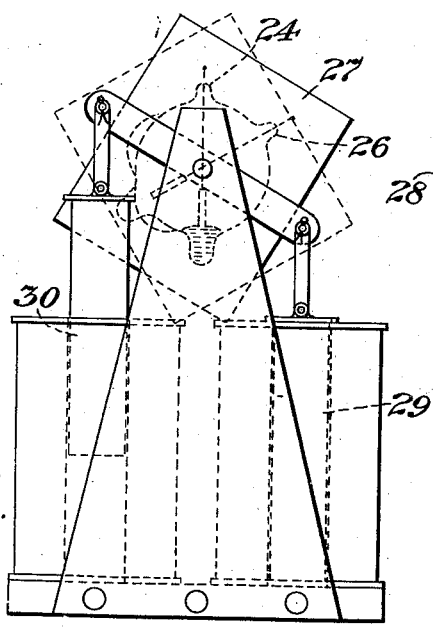
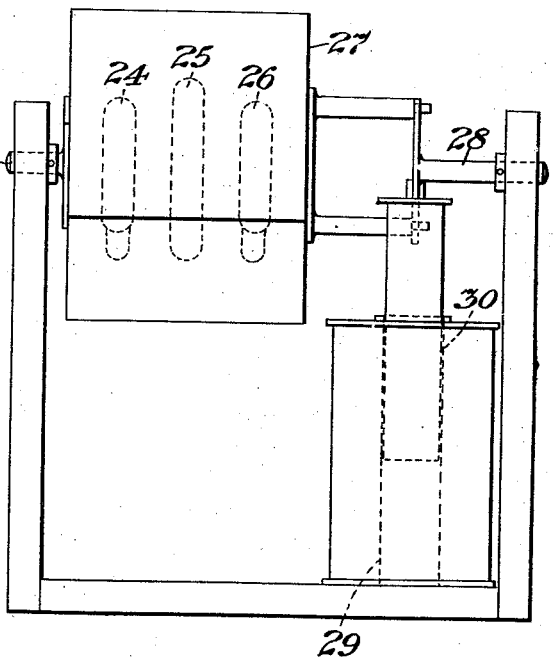
INVENTOR
Frederick G. Keyes
BY
Starr Page Cooper & Hayward
HIS ATTORNEYS Patented Mar. 29, 1927.

1,622,519

UNITED STATES PATENT OFFICE.

FREDERICK G. KEYES, OF CAMBRIDGE, MASSACHUSETTS, ASSIGNOR, BY MESNE ASSIGNMENTS, TO NATIONAL REFRIGERATING COMPANY, OF BOSTON, MASSACHUSETTS, A CORPORATION OF MASSACHUSETTS.

APPARATUS FOR PRODUCING REFRIGERATION.

Application filed February 19, 1920. Serial No. 359,882.

My present invention relates to methods of and apparatus for producing refrigeration, and is more particularly concerned with apparatus of the automatic type, wherein is employed a material, such as ammonium nitrate, for taking up and storing the refrigerant vapor, such as ammonia, during the evaporation period.

I have discovered that when a material especially prepared and activated, as for example, charcoal prepared from wood chips impregnated with metallic salts previous to carbonization of said chips, is utilized in a refrigerating apparatus of the type referred to, a new method of refrigeration is produced having marked advantages over previous known methods, in that the materials which have a structure similar to the prepared charcoal mentioned take up the refrigerant by adsorption, whereas the ammonium nitrate, for example, of previous methods functions as an absorbent.

By way of explanation, it may be stated that it is a well known fact that solid surfaces are capable of condensing gases thereon and holding them tenaciously. Such substances are, for example, charcoal, dried silica gel, dried colloidal ferric hydroxide, meerschaum, powdered glass and the gases are hydrogen, nitrogen, oxygen, carbon dioxide, methyl and ethyl chlorides, nitric oxide, and indeed, undoubtedly, all gases. The amount of the gases adsorbed on the same substance (charcoal for example) appears to increase in proportion approximately to the critical temperature of the substance. It is, however, at once evident that the structure and physical condition of an adsorbing material will be factors as regards the capacity and behavior of an adsorbent or at least be a consequence of the realization of a certain optimum physical state in the adsorbing substance; for example, freedom of the surface from contaminating layers of non-volatile substances, such as heavy hydrocarbons, which will prevent the attractive property of the surface from attaining its greatest magnitude. The extent of the surface is further a condition which must be considered; for the amount of vapor condensed, other things being equal, would vary approximately as the amount of adsorbing surface, or as the porosity of the material which can be presented to the vapor or gas. While it appears to be true that all solid substances are capable of condensing or adsorbing gases upon their surfaces, it will be equally evident that the amount of the gas or vapor adsorbed will primarily depend upon the specific character of the adsorbent in question. For example, a surface composed of carbon atoms might possibly possess a greater force of attraction for a particular gas or vapor than would an adsorbent layer composed of atoms of silicon. There appears to be no a priori guide at the present time for deciding upon the best substance, and experience teaches that among ordinary substances charcoal is capable of adsorbing the largest quantities of gases or vapors. It is evident, on account of the inadequate knowledge concerning the number and relation of the variables pertaining to adsorbents that it is difficult to decide whether the greater adsorbent capacity of charcoal is due to the specific nature of the carbon atoms or the extent of the surface (porosity) presented to the adsorbing gas or vapor or to other causes. Here experience must be the guide, and it has in fact been found that when methods are used in preparing the charcoal calculated to preserve the cellular structure (and therefore greater surface) that an increased capacity results. It has also been found by me in my work in France on war charcoals, that in general, the speed of adsorbing or the rate at which the gas or vapor is condensed on the adsorbent, for example charcoal, is increased in proportion as gases or vapors already present are rinsed from the surface of the adsorbent. It appears to be a fact moreover that the ultimate capacity with respect to any particular gas or vapor is dependent on the absence of other gas or vapor molecules. As an example, it can be stated that in a particular sample of charcoal saturated with air and presented to ammonia, the rate of adsorption was small at the beginning; rose to a maximum; and diminished as saturation was approached. By pumping off the ammonia, heating, and readmitting ammonia, the rate will increase until after successive rinsings, the rate becomes a maximum at the start and drops off progressively until saturation is reached.

The rate of adsorption in the work referred to increased as a consequence of the rinsing many fold, thus demonstrating the importance of freeing the gas surface from foreign molecules. Evidently, aside from air or moisture, it is heavy molecules of hydrocarbon vapors resulting from the decomposition of the wood in the preparation of charcoal which must also be cleaned off from the surface and out of the pores of the charcoal. It has been found, in practice, that this may be effected by gentle oxidation, and is referred to technically as "activation"; although several theories have been advanced which do not emphasize the surface cleaning as the only conception of the activation effect. As a means of preserving the cellular structure in the charcoal, a treatment of the wood chips was carried out by means of metallic salts, such as zinc chloride, chromic acid, among others. While zinc chloride and chromic acid have been found to be effective for that purpose, it is possible that there are other salts which will be more effective in certain cases or with certain varieties of cellular material. It appears to be advantageous also t par ly carbonize chemically, as for example with sulphuric acid, finally completing the process by heat in the ordinary manner.

I have illustrated my invention in the accompanying drawings, in which—

Fig. 2 is a sectional elevation of the intermediate or collecting chamber showing in detail the improved operating mechanism thereof;

Figure 1:
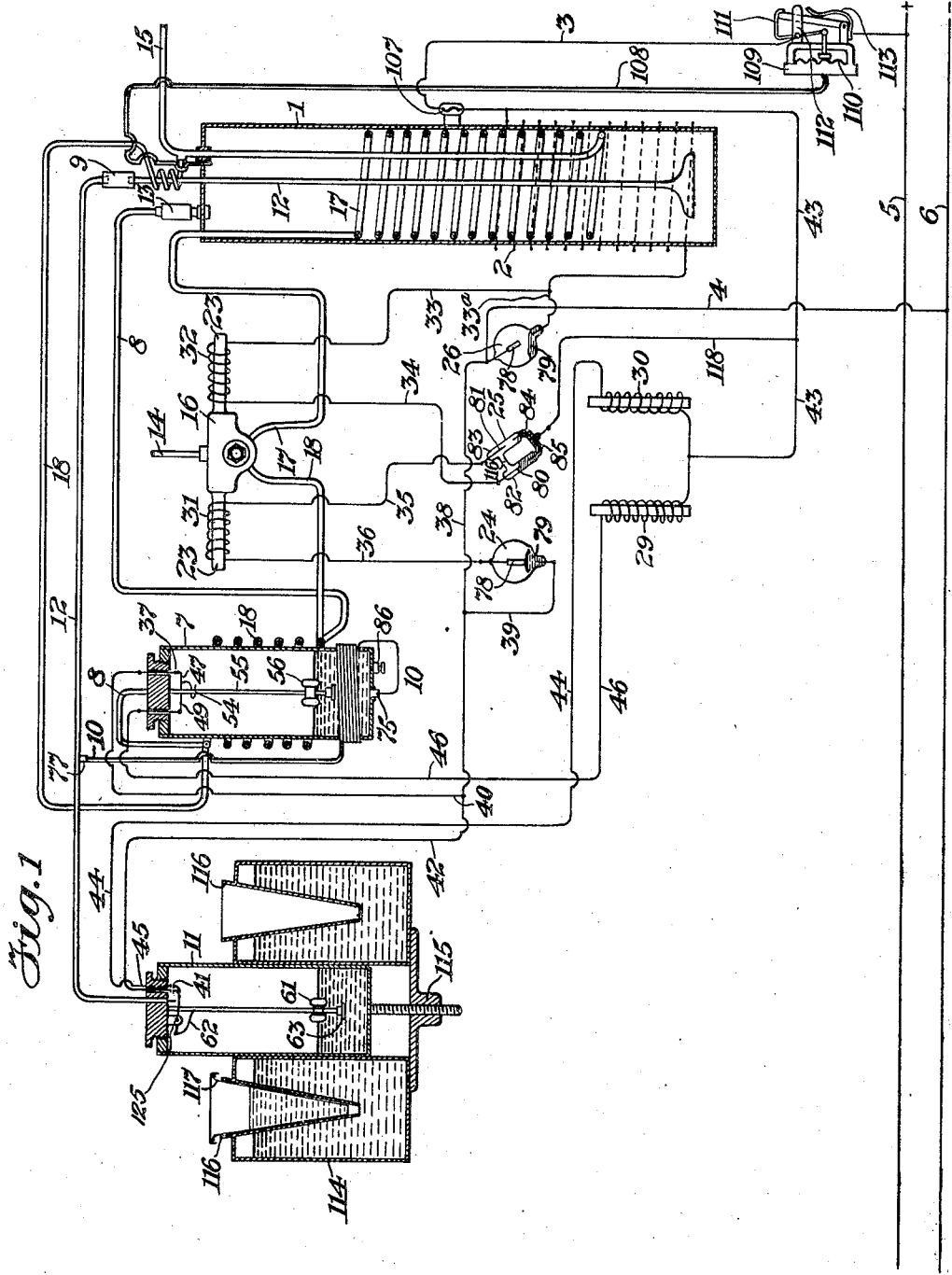
Fig. 1 is a diagram of one embodiment of my invention for producing refrigeration.

Fig. 2ª is a detail of the glass pivots;

Fig. 3 is a sectional elevation of the refrigerating chamber, showing in detail the novel operating mechanism thereof;

Fig. 4 is a plan view of Fig. 3;

Fig. 5 is a plan view of the two way water valve box, with the cover removed, showing the relative position of the parts in operation;

Fig. 6 is a sectional elevation of the water valve and showing in detail the novel mechanism for insuring the centering of the valve at each operation thereof;

Fig. 7 is an elevation, partly sectional, of the one way valve in the exit pipe-line connecting the refrigerating chamber with the intermediate chamber;

Fig. 8 is an elevation, partly sectional, of the one way valve in the pipe-line connecting the distilling chamber with the refrigerating chamber;

Fig. 9 is a sectional plan on the line $x$—$x$ of Fig. 8;

Fig. 10 is a sectional elevation of a novel insulating and gas-tight joint for the electrical conductors passing into and out of the various chambers of the apparatus;

Fig. 11 is a sectional elevation of a novel gas-tight joint for the pipes passing into and out of the said chambers;

Fig. 12 is an end view of the novel switch mechanism showing the relative positions of the parts in the two operating positions thereof; and Fig. 13 is a front elevation of Fig. 12 showing in detail the mechanical connections between the switch case and magnets cooperating therewith.

Referring to Fig. 1, a distillation chamber or still, 1, containing the refrigerant, ammonia for instance, and a material having an affinity therefor, ammonium nitrate, ammonium sulphocyanate, for example, or activated adsorbent, such as charcoal is surrounded by an electric heating coil, 2, connected by wire, 3 and 4, through suitable control mechanism presently to be described, to a suitable source of current, 5, 6.

A condensing chamber, 7, is connected to the still 1 by a pipe, 8, a one way valve, 13, permitting passage of the refrigerant material only in the direction of the condenser, 7, being located in said pipe 8. A capillary, 10, connects the chamber 7 with a refrigerating chamber, 11, and a pipe, 12, containing a one way valve, 9, permitting flow of the refrigerant only toward still 1, connects the chamber 11 and the still 1.

A cooling device comprising a water supply indicated by an inlet pipe, 14, and an outlet pipe, 15, is connected through a two way valve box, 16, to a cooling coil, 17, in the still 1 and to a cooling coil, 18, surrounding the condenser 7. In the box 16 (Figs. 5 and 6) is mounted a valve, 19, having an outlet hole, 20, and a rod, 21, pivoted on a bar, 22, of magnetic material incased in brass to prevent rusting, mounted to oscillate in lateral extensions, 23, 23, of the box 16, to shift the outlet hole 20 into registry with the pipe leading to the still coil 17 or the condenser coil 18, the shifting of the valve 19 being accomplished at the desired time by an electrical system about to be described.

A number of switches, 24, 25 and 26 mounted in a box, 27, (Figs. 12 and 13) rotated on trunnions, 28, 28, by a pair of electro-magnets, 29 and 30, are connected to the heater coil 2 and to magnet coils, 31 and 32, on the arms 23, 23, of the water valve box 16, by conductors 33, 33ª and 34 and 35 and 36, respectively, and to a contact point 37 in the condenser 7 by wires, 38, 39, and 40, and to a contact point, 41, in the refrigerating chamber 11 by a conductor, 42.

The magnets 29 and 30 are connected through a wire, 43, common thereto, to the conductor 3 on the one hand, and on the other hand, the coil 30 is connected by a wire, 44, to a contact, 45, in the chamber 11 and the coil 29 is connected by a wire, 46, to a contact, 47, in the chamber 7.

The contact 47 is attached to a bar, 48, pivoted at 49 in a bracket, 50, attached to chamber 7 by a screw, 51, a stop, 52, limiting the movement in one direction of the bar 48. As the bar 48 carries the current from the wire 46 to the contact 47, the pivot 49 is an insulating one, glass points, 53, 53, being utilized as bearing (Fig. 2ᵃ). A wire, 54, fastened to bar 48 passes around a guide rod, 55, extending into the chamber, for a float, of glass, 56, which engages with said float to bring the electrodes 37 and 47 into contact.

The contacts 41 and 45 in chamber 11 are bridged by a bar, 57, (Fig. 3) pivoted at 58 in a bracket, 59, attached to the chamber 11. A hollow guide rod, 60, for a glass float, 61, extends into the chamber 11 and a wire, 62, attached to the remote end of the bar 57 passes down through the rod 60 to a button, 63, below the float 61 and adapted to engage the float and cause the bar 57 to connect the electrodes 41 and 45. Glass bearings 125 are provided for the wire 62, these bearings being insulating and frictionless.

The electrical connections to the interior of the still and the chambers in apparatus of this type, of necessity, must be insulated and gas-tight and in Fig. 10 I have shown the joint utilized in the above described apparatus and one which is useful not only for present purposes but also in the arts generally and particularly in high pressure work.

The container wall is shown at 7 and the lead-in wire at 40 having a flat collar, 64, of metal seated in a shouldered sleeve, 65, of slate, talc, or porcelain, if ammonia is present in the container, but red fibre or hard rubber can be used in high pressure work, generally. A layer of soft or pure Pará rubber, 66, is placed on the member 65, and a few discs of mica 67 are laid on the rubber 66. A sleeve of hard rubber having a flanged end 68 is next put in place over the mica disks and a steel nut 69 is screwed down and tightened to the desired degree, the mica disks permitting the greatest degree of compression of the members, without distortion thereof, due to the fact that they slide around on each other readily.

The mechanical joints of the pipes into the chambers and the still must be gas tight and rugged and the joint utilized for this purpose herein is shown in detail in Fig. 11, and is useful in the arts generally and particularly in high pressure work.

The coupling or joints of the pipe 12 and the capillary 10, which is sealed into it by silver solder at 77, into the chamber 11 is taken as an example. One end of a pipe, 70, is screwed tightly into a stepped hole, 71, in the container 11, an aluminum washer, 72, being first laid on the step to aid in sealing at this point, a portion of the pipe 70 extending past the washer 72 to prevent the spreading of the washer closing the passage. The other end of pipe 70 is provided with a conical seat, 73, for a tubular cone, 74, sealed to the pipe 12 by silver solder, there being a difference of approximately one half of one degree in the angles of the said seat and the said cone. A screw threaded nut, 75, resting on the shoulder, 76, of the cone 74, engages with a screw threaded portion of the pipe 70, and serves, when screwed down, to force the tip of the cone 74 into the seat 73 due to the difference in angles of the cone and its seat. The forcing in of the cone 74 causes the metal to spring or give slightly at the point of contact of the seat 73 and the rim of the cone 74 and once the joint is made tight, increases and decreases of pressure above normal in the tubular portion are taken care of, within wide limits, by the springing action of the metal joint in the neighborhood of this point.

A drip-cock, 86, in which the principle of the above described coupling or joint is utilized is employed and shown in detail in Figs. 2 and 3. The member 86, is screwed into the container wall, the tip of a cone, 87, on the end thereof, being forced into a seat, 88, therefor in the container wall and slightly past the rim of a hole 89, therein, due to the difference in angles of the cone 87 and the seat 88 and the spring of the metal, and forming a gas tight joint at the point of contact.

The screw bolt 86 is provided with a hole, 90, therethrough and terminating at the inner end on the face of the cone and to one side of the tip thereof. A turn of the member 86 out and in serves to open and close the joint.

The switches 24 and 26 are of glass, exhausted if desired or filled with an inert gas, and have a solid electrode, 78, sealed therein, and a liquid electrode of mercury, 79, and are mounted in the box 27 (Figs. 12 and 13) so that in one of the two positions of the box 27, the liquid electrode of one switch is in contact with the solid electrode thereof, while the liquid electrode of the other switch is out of contact with the solid electrode of said other switch. When the box 27 is moved to the other position referred to, the mercury in the switches 24 and 26, is moved and reverses the conditions mentioned.

The switch 25 is of the same general type as switches 24 and 26, but is provided with two solid electrodes, 80 and 81, mounted in chambers, 82 and 83, and a mercury electrode 84, connecting the two electrodes 80 and 81 when the switch is in an upright position, and flow restricting tube or capillary, 85, connects the two chambers 82 and 83, and in the present instance is of a size sufficient to restrict the flow of mercury 84 and prevent the breaking of a circuit therethrough on the shifting of the switch from one extreme position to another until a predetermined time; say 5 seconds have elapsed. An equalizing tube for the gas filling 116, connect the tubular members 80—81.

The valve 9 permitting flow in the pipe 12 in the direction of the still 1 only is shown in detail in Figure 8 and at 91 is shown a rigid tubular member in the opening 92, in the shell of the valve 9. A number of passages 93, 93 in the side of the member 91 are closed off by a piece of pure india rubber tubing, 94, held in place by a top piece, 95, having notches, 96, 96, cut in the periphery thereof and preferably over the passages 93.

The valve 13 in the pipe 8 and permitting flow only in the direction of the chamber 7 is of a more rugged construction than the valve 9, and the details of said valve 13 are shown in Figure 7. The inner wall of the shell 13 is screw threaded to receive a screw threaded perforate plate, 97, the perforations being shown at 98, 98, for permitting gas flow therethrough.

One end of a rod, 99, passes through a central opening, 100, in said plate 97, and extends into a tube, 101, opening into the interior of the shell 13, where said rod is provided with a cone, 102, having a shoulder, 103. A layer of rubber, 104, is laid on the shoulder 103, and bears against the cone-faced opening of the tube 101, and is held in place by a metal washer, 105, and a locknut 105$^a$, both being screwed on to the rod 99, and compresses the rubber sealing cone 104 against the shoulder 102, a spring of noncorroding material, such as phosphor bronze or tungsten, 106, being interposed between said washers and the plate 97, to put sufficient tension on the sealing cone 104 to cause it to rest on the cone-faced opening of the tube 101.

The still 1 is provided with protective devices for cutting off the electric supply in the event the temperature or the pressure in the still goes beyond safe limits. Accordingly, a wire, 107, fusible at the desired temperature is mounted on the side of the still 1 and included in the circuit 3, 4, for breaking the supply circuit; and a capillary, 108, leading from the interior of the still 1 to a pressure chamber, 109, having a diaphragm, 110, pressing against one end of a pivoted lever, 111, and operating, on abnormal increase of pressure in the still, to open switch contacts, 112 and 113, in the line 3.

A brine tank, 114, mounted on an adjustable plate, 115, surrounds the refrigerating chamber 11, and is provided with receptacles, 116, 116, in which water in cans 117, may be placed and frozen. In operation, with the absorbent material and the refrigerant in the still 1, the switch box 27 is tilted to throw the electrodes 78 and 79 of the switch 26 into the position of make and the electrodes 78 and 79 of the switch 24 into the out of contact position; the terminal 84 moving into contact with the terminal 81 in the switch 25, and current then flows from the main 5, through conductor 3, heating coil 2, conductor 33$^a$, switch 26 and wire 4, to the main 6, starting the distilling of the refrigerant over to the collecting chamber 7, by way of pipe 8 and one way valve 13. At the same time, current passes through a shunt circuit comprising the conductor, the wire 118, terminals 84 and 80 in the switch 25, wire 34, coil 32, wire 33, wire 33$^a$, switch 26 and conductor 4, to the main 6, energizing the magnet coil 32 and causing it to draw the bar 22 into the extension 23 of the valve box 16, which in turn moves the rod 21 and the valve 19 to a point where the hole 20 registers with the duct leading to the cooling coil 18 on the chamber 7 and the water is cut off the still 1 and then flows through said coil 18 and serves to condense the refrigerant in the chamber 7 as it is distilled over from the still 1.

To insure that the valve 19 is properly seated when moved from one position to the other, I have provided the valve with a spindle, 119, pointed at its outer end and engaging with a seat, 120, therefor in the end of a spring pressed rod, 121, capable of movement in a bearing plate, 122, the spring being shown at 123. Any vertical movement of the valve 19 tending to displace the valve from its seat is resisted by the arrangement just described, and the valve is forced back to its proper place.

When the valve 19 has been shifted as described, the circuit through the coil 32 is broken by the switch 25 in the following manner. As this switch 25 is now tilted into the position opposite that shown in Figure 1, the tendency of the mercury therein due to a gravity is to move into the chamber 83. However, the capillary 85 between the chambers retards the flow of the mercury, and in the present instance is of such a size as to prevent the breaking of the circuit at electrode 81 until five (5) seconds have elapsed, this period being found sufficient to insure the shifting of the valve 19, the passage 116, aiding in maintaining equilibrium of the inert gas in the switch 25 during this period, as will be understood by those skilled in the art.

As the condensing and collecting of the refrigerant in the chamber 7 proceeds the rising level of the liquid raises the float 56 on the rod 55 and when the desired amount of refrigerant has been distilled over, the float 56 is forced against the member 54, and raises the electrode 47 into contact with the electrode 37. Current then flows through wire 43, coil 29, conductor 46, electrodes 47, 37, wire 40, conductor 38, and line 4 to the main 6, causing coil 29 to draw its armature down and tilt the switch box 27 and the switches 24, 25 and 26 into the position indicated in solid lines in Figure 12, whereupon the electrodes in switch 26 are separated, breaking the circuit through the heater coil 2, and stopping the distilling operation; and simultaneously bringing the electrodes 78 and 79 together in the switch 24, causing current to flow through wire 43, conductor 118, terminals 84 and 81 in the switch 25, wire 35, coil 31, conductor 36, switch 24 and wires 39, 38 and 4 to the main 6. The magnet 31 is thus energized and draws the bar 22 into the lateral extension 23, which the coil 31 surrounds, and causes the shifting of the valve 19 to cut off the water supply to the cooling coil 18 on the chamber 7 and pass the water through the coil 17 in the still 1. When five seconds have elapsed from the time of shifting of the switch box 27, the mercury flowing through the capillary 85 from electrode 81 toward electrode 80 will break the connection between electrodes 81 and 84 and open the circuit of the coil 31.

During the period of collection of the refrigerant in the chamber 7, sufficient liquid flows through the capillary 10 into the chamber 11 to lift the float 61 off the button 63, thus preventing premature closing of the contacts in that chamber.

The refrigerant continues to flow through the capillary 10 into the chamber 11 and, as will be evident, the level of the liquid and the float 56 will soon fall enough to allow the contacts 37 and 47 to separate, thus opening the circuit through the coil 29.

When the cooling water is passed through the coil 17 in the still 1, the back pressure falls, due to the cooling of the absorbent or adsorbent material therein, causing a difference of pressure between the refrigerating chamber 11 and the still 1 whereupon the liquid ammonia in the chamber 11 begins to evaporate and produce refrigeration at that point the ammonia vapor passing through the pipe 12 and the one way valve 9 to the still 1 where it is taken up by the absorbent or adsorbent material.

In the meantime, the liquid ammonia, which is prevented from passing to the still 1 by the check valve 13, continues to pass to the chamber 11, until the chamber 7 is empty, the dimensions of the capillary or flow restricting tube being such that the said chamber is emptied of liquid long before the end of the evaporation period.

The evaporation and refrigeration period in the chamber 11 referred to above continues until the level of the liquid falls below the point where the float 61 rests on the button 63, whereupon the weight of the said float forces the button 63 and the wire 62 attached thereto downward. This action causes the raising of the bridge piece 57 to close the circuit across the terminals 41 and 45, and current then flows through wire 43, coil 30, wire 44, contact 45, bridge piece 57, contact 41, conductors 42, 38, and 4 to the main 6, causing the coil 30 to shift the switch box 27 to the first position above described, bringing the heater coil 2 into operation and shifting the water supply from the coil 17 to the coil 18 and cutting out the coil 32 after the water transfer has been accomplished. Thereafter, the cycle of operations above described is repeated automatically.

When starting the apparatus for the first time, the wire 42 or the wire 44 is broken, and the switch box 27 is tilted to close the circuit through the switch 26, which starts the distilling operation in the still 1 and the condensing coil on the chamber 7 the pressure of the ammonia increasing due to the rise in temperature in the still and continuing to increase until it reaches the condensing pressure corresponding to the temperature of the water in the coil 18, and latent heat of liquefaction being extracted and liquid ammonia collecting in the chamber 7. No appreciable amount of liquid can flow through the capillary 10 into the refrigerating chamber 11 at this time, due to the fact that the temperature and, therefore, the pressure is substantially the same in the refrigerating and condensing chambers 11 and 7. The float 56 rising with the level of the liquid in chamber 7, closes the circuit through the switch box tipping mechanism, setting the mechanisms connected with the switches 24, 25 and 26 in the position to cut off the heater 2 on the still 1, and transfer the water supply to the still to cause the pressure in the still to fall, creating a difference of pressure between the refrigerating chamber and the intermediate chamber whose temperature continues to fall on the one hand and between the refrigerating chamber and the still on the other hand, and liquid ammonia begins to pass through the flow restricting capillary 10 to the chamber 11, where it evaporates and the vapor passes to the still 1 where it is taken up by the absorbent or adsorbent material in the still.

When the liquid in the refrigerating chamber 11 is exhausted, the wires 42 and 44 are joined by hand for a period sufficient to shift the switch box 27 into position to start the distilling operation above described, after which the said wires are again separated. Distillation now takes place and in the first few moments liquid appears in the chamber 7 and enters the capillary 10, and continues to flow into the chamber 11, due to the fact the temperature of the brine and said chamber has been altered in the evaporation period above described, and the size of the capillary 10 is such that enough liquid ammonia will pass into the chamber 11 to raise the float 61 and open the contacts 41 and 45. The wire 42 or wire 44 is now connected to its appropriate terminal 41 or 45, as the case may be, and the operation will continue automatically as above described.

During the starting period, the air in the apparatus is released by opening the valves 86 in the chambers 7 and 11, as will be apparent, these valves remaining closed during normal operation.

One of the advantages of the use of an adsorptive material in the present apparatus is that the refrigerant in the adsorptive material is in a condition equivalent to solid form, a factor of considerable importance in the function, shipping and handling of the apparatus..

This application is a continuation in part of my application Serial No. 186,692, filed August 17, 1917.

I claim:—

1. In a refrigerating apparatus, the combination of a distilling chamber, a condensing chamber, and a refrigerating chamber, of a cooling device for the still and the condensing chamber, of electrical means for starting the still into operation and simultaneously applying a cooling medium to the condensing chamber, means for shutting off the still and transferring the cooling medium thereto when sufficient refrigerant has been collected in the condensing chamber, and automatic means for cutting out the electrical means after each period of operation.

2. A refrigerating apparatus, comprising a still, a condensing chamber therefor, and a refrigerating chamber connected to the condensing chamber and the still, in combination with a switch box, of means for tilting said switch box in one direction to start the distilling operation, and means for tilting the switch box in the opposite direction to stop the distilling operation and start the refrigerating operation.

3. In a refrigerating machine, a still, a condensing chamber, and a refrigerating chamber, electrical contacts and a float in said condensing chamber, and electrical contacts and a float in said refrigerating chamber, said floats being mounted in operative relation to said contacts in each of said chambers to close and open the said contacts cyclically.

4. In a refrigerating machine, a two-way water valve a pair of magnets for operating said valve, a switch having three electrodes, one of which is movable relative to the other two, and means in said switch for preventing the separation of the electrodes after the shifting thereof until a predetermined time has elapsed.

5. In a refrigerating apparatus, the combination of a distilling chamber, a condensing chamber, and a refrigerating chamber, of a cooling device for the still and the condensing chamber, of electrical means for starting the still into operation and simultaneously applying a cooling medium to the condensing chamber, means for shutting off the still and transferring the cooling medium thereto when sufficient refrigerant has been collected in the condensing chamber, and automatic electrical switching means for cutting out the electrical means controlling the cooling medium after each shifting operation of the cooling medium.

6. In a refrigerating apparatus, the combination of a distilling chamber, a condensing chamber, and a refrigerating chamber, a one way connection from the distilling chamber to the condensing and refrigerating chambers and another one way connection from the refrigerating chamber to the distilling chamber, of a cooling device for the still and the condensing chamber, of electrical means for starting the still into operation and applying a cooling medium to the condensing chamber, means for shutting off the still and transferring the cooling medium thereto when sufficient refrigerant has been condensed by the condensing chamber, and automatic means for cutting out the electrical means at or near the end of each period of operation.

7. In a refrigerating apparatus, the combination of a distilling chamber, a condensing chamber, and a refrigerating chamber, a one way connection from the distilling chamber to the condensing and refrigerating chambers and another one way connection from the refrigerating chamber to the distilling chamber, of a cooling device for the still and the condensing chamber, of electrical means for starting the still into operation and applying a cooling medium to the condensing chamber, means for shutting off the still and transferring the cooling medium thereto when sufficient refrigerant has been condensed by the condensing chamber, and automatic electrical switching means for cutting out the electrical means controlling the cooling medium contemporaneously with each shifting operation of the cooling medium.

8. In a refrigerating apparatus, the combination of a distilling chamber and heating means therefor, a condensing chamber, and a refrigerating chamber, a one way connection from the distilling chamber to the condensing and refrigerating chambers and another one way connection from the refrigerating chamber to the distilling chamber, of a cooling device for the still and the condensing chamber, of automatic means for starting the still into heat operation and applying cooling medium to the condensing chamber when sufficient refrigerant has been evaporated from the refrigerating chamber, and of automatic means for shutting off heat from the still and transferring the cooling medium thereto.

9. In a refrigerating apparatus, the combination of a distilling chamber and heating means therefor, a condensing chamber, and a refrigerating chamber, a one way connection from the distilling chamber to the condensing and refrigerating chambers and another one way connection from the refrigerating chamber to the distilling chamber, of a cooling device for the still and the condensing chamber, automatic means for shutting off heat from the still and transferring the cooling medium thereto when sufficient refrigerant has been condensed by the condensing chamber, and automatic means for starting the still into heat-operation and transferring cooling medium to the condensing chamber when sufficient refrigerant has been evaporated from the refrigerating chamber.

In testimony whereof I affix my signature.

FREDERICK G. KEYES.